United States Patent [19]

Wilding

[11] 4,044,157

[45] Aug. 23, 1977

[54] PROCESS FOR PREPARING EXPANDED SOYBEAN GRANULES

[75] Inventor: Morris D. Wilding, Downers Grove, Ill.

[73] Assignee: Swift & Company, Chicago, Ill.

[21] Appl. No.: 642,208

[22] Filed: May 29, 1967

Related U.S. Application Data

[63] Continuation-in-part of Ser. No. 436,358, March 1, 1965, abandoned.

[51] Int. Cl.$^2$ ............................................... A23J 3/00
[52] U.S. Cl. .................................... 426/250; 426/104; 426/629; 426/634; 426/656; 426/448
[58] Field of Search ................... 99/14, 17, 81, 82, 98, 99/99, 107, 108, 109; 264/176, 202, 51, 53; 426/104, 250, 104, 629, 634, 656, 448

[56] References Cited

U.S. PATENT DOCUMENTS

| 3,102,031 | 8/1963 | MacAllister et al. | 99/14 |
| 3,119,691 | 1/1964 | Ludington et al. | 99/2 |
| 3,139,342 | 6/1964 | Linskey | 99/2 |
| 3,268,336 | 8/1966 | Hale et al. | 99/80 |
| 3,940,495 | 2/1976 | Flier | 426/104 |

Primary Examiner—Raymond N. Jones
Attorney, Agent, or Firm—Edward T. McCabe; Charles E. Bouton

[57] ABSTRACT

A protein food product having an expanded, elongated cellular structure similar to meat is prepared by forming a dough of about 15–45% water and undenatured oil seed flour of less than 3% fat. The dough is heated under pressure over a period of less than 5 minutes to a maximum temperature of 260°–380° F., whereupon it is extruded into the atmosphere. The pressure drop causes formation of an expanded cellular structure, while the extrusion elongates the structure. The product, when hydrated, simulates the texture of lean meat.

16 Claims, No Drawings

PROCESS FOR PREPARING EXPANDED SOYBEAN GRANULES

This application is a continuation-in-part of my co-pending application, Ser. No. 436,358, filed Mar. 1, 1965, now abandoned.

The present invention relates to manufactured protein food products and a method for making the same, and more particularly to the production from oil seed sources of a protein product of novel structural characteristics.

Lean meat is essentially voluntary muscle tissue, made up of an oriented mass of elongated cells bound together by a connective tissue composed of the protein collagen. For many years there has been a great deal of interest in producing a synthetic lean meat from inexpensive protein sources, and many attempts have been made to do so. Principal among the processes which have been proposed are those involving the extrusion of denatured, isolated protein materials into tiny strands as obtained, for example, when protein is extruded through a spinnerette. Subsequent to their formation, the strands are bound together, usually by heat treatment or the addition of a binder.

Such a process suffers from several inherent difficulties. Primary among them is the large amount of equipment and labor required to produce such bound protein products. Secondly, such products have a tendency to taste slightly chalky and to retain some of the characteristic "beany" flavor. Finally, such protein isolates have a relatively low nutritional value compared with the initial protein.

Although practitioners in the art have prepared protein products that have an expanded cellular structure, these products do not have the fibrous texture of meats because of a lack of orientation of the cells and the protein surrounding them. Thus, while the product is chewy, it also has a somewhat "spongy" texture, rather than the fibrous, cellular structure necessary to properly simulate meat. In addition these prior art expanded products do not retain their identity upon further heating in an aqueous media. While such products may be usable as meat extenders, they do not very closely approximate the texture of meat, and therefore make a poor substitute.

It is therefore an object of the present invention to provide an improved protein food product.

It is another object of the present invention to provide from oil seed sources a relatively bland protein product having a fibrous texture and an expanded, elongated cellular structure.

It is another object of the present invention to provide a relatively bland protein product having a texture and cellular structure similar to meat.

It is another object of the present invention to provide a method for converting high-protein oil seed materials into a chewy product of bland flavor and texture similar to meat.

It is another object of the present invention to provide an expanded protein product of improved nutritional value.

Additional objects of the invention if not specifically set forth herein will be readily apparent to those skilled in the art from the following detailed description of the invention.

Generally, the present invention relates to a method for the treatment of defatted oilseed protein to produce a bound product having a relatively bland flavor and a fibrous, elongate cellular structures. The method essentially involves the formation of a dough by combining the undenatured protein source with water, heating the dough under pressure to a temperature sufficient to bring about a rapid denaturation, and immediately extruding the dough into an area of reduced pressure, such as the atmosphere. Depending on the moisture content of the dough, the product may be extruded either in the form of a continuous bar or discrete chunks. Because the dough is heated under pressure, the flashing off of the water when it is extruded into the area of reduced pressure causes the product to expand and assume an expanded cellular structure. At higher moisture levels, the flashing off becomes so violent that the extruded product is blown apart, and does not issue from the extrusion orifice as a continuous bar. The fact that the product is extruded produces an elongation of the structure, resulting in a product having a fibrous, elongated cellular structure similar to that found in lean meat. It is essential, however, that the extrusion be carried out immediately subsequent to the denaturation step in order to preserve the identity of the elongated cellular structure, as well as to avoid a deleterious effect upon the selfbinding nature of the product.

More particularly, it has now been found that the heating under pressure of a dough of water and defatted, undenatured, solvent-extracted oilseed protein source followed by an extrusion of the dough immediately subsequent to the denaturation of the protein, produces a protein food product of very desirable properties, simulating the structure and texture of lean meat. Such a process may be accomplished with any of the well-known and readily available essentially non-farinaceous oilseed protein sources having less than about 10% starch such as peanuts, and cottonseed protein, and the like, although the method has particular application to the treatment of soybean protein or soybean protein blended with amounts of other oilseed protein sources.

The protein raw materials should be extracted, desolventized or otherwise handled as required at low temperatures to avoid denaturation of the protein, and preferably ground to a small particle size. In such condition, the raw material is described as a "flour." Solvent-extracted soybean flakes containing less than 3%, and preferably less than about 1.5% fat, and ground to a particle size sufficient to pass a 65 mesh screen, form a suitable source. In some instances the flakes can be used without grinding. The flour should contain at least 50% of the total protein as water-soluble protein as determined by the Nitrogen Solubility Index method (AOAC BA 11-65). There is a relationship between the fat content and protein solubility necessary for a flour suitable for use in the present invention. When the fat content is below about 1%, at least about 50% of the total protein should be present in the water-soluble state. As the fat content increases, the percentage of water-soluble protein required also must increase. This flour may be described as undenatured, solvent-extracted, oil-free soy flour.

In carrying out the method of the present invention, it is first necessary that the above-described flour be combined with water to form a stiff dough. When the dough is finally ready for extrusion, the moisture content should be sufficient to form a dough of sufficient plasticity to be extruded in a self-binding form. The amount of moisture that must be incorporated to achieve these characteristics varies with the protein raw material. For example, when soybean flour is used, the total moisture content is preferably between about 15% and about 35%, based on the total weight of the dough. For cottonseed flour, the moisture content is preferably between about 15% and about 45% based on the total weight of the dough. Below about 15%, the dough becomes too dry to be extruded without producing excessive frictional heat, and further suffers from insufficient expansion during the extrusion because of an inadequate amount of water to flash off. If the moisture content of the dough is too high, the dough begins to form a fluid slurry, which, because of its inability to sustain its shape, does not generate sufficient pressures at the extruding orifice.

In addition to the moisture level, it is important that the dough be substantially free of ionic salts since the presence of even small quantities of these salts such as sodium chloride will have an adverse effect on the desired expansion and cell formation in the final product. However, suitable final products may be prepared when very small amounts of ionic salts are present by varying the operating conditions, but when the salt content of the dough is greater than about 1–1.5% the desired expanded elongated cellular structure will not be produced.

It is also important that the pH of the dough be maintained in the proper range. If the dough is below about pH 5.5 the product begins to develop an undesirable odor and flavor, while with pH values above about 7.5 there occurs an alkaline reaction with the protein, causing the release of ammonia. Because such high pH values cause a hydrolysis of protein, the protein will lose its binding properties, and thus the advantageous structural identity of the product will be lost.

Because the normal pH of the soy flour employed is about 6.4, adjustment is usually unnecesary. However, adjustment within the indicated range may be used to alter the properties of the finished product. If the dough is acidified by the addition of a non-toxic acid, the product will be more brittle and exhibit less expansion than is obtained at the normal pH of 6.4. On the other hand, if the dough is more alkaline, the final product will show increased expansion, but will be softer and more mushy as a result of increased wate absorption at the higher pH values.

As previously mentioned, it is important that the protein denaturation be carried out rapidly in order to obtain a product of the proper structural identity. Thus, for good results total heating time should not exceed about five minutes, and preferably the time during which most of the denaturation actually takes place is less than about one minutes. Times exceeding this specified period will result in a product which will not have the desired structural identity. Conversely, it is important that the denaturation be carried out for a time sufficient to render the product as completely denatured as possible, for if this is not accomplished, the product will not sustain its structure when hydrated because of a dissolution of the undenatured protein in water.

In order to effect the necessary rapid denaturation which is required, it is important that the dough be heated to relatively high temperatures under sufficient pressure to avoid evaporation of the water in the dough. Such denaturation may be brought about by heating the dough to a maximum temperature of from about 260° to about 380° F., at which temperature the dough is extruded. Although higher temperatures could be employed, above this range there is a substantial danger of discoloration along with a deleterious effect upon the flavor of the product. Conversely, it is possible to employ extrusion temperatures as low as 175° F., although uniform results are difficult to achieve, Of course, when temperatures below the normal boiling point of water are employed, it is necessary to extrude the product into an area of subatmospheric pressure in order that the water will "flash off." In order to avoid excessive or premature denaturation, it is preferred that the dough be heated for a time period that does not exceed about five minutes.

It will be understood that any of a wide variety of heating methods may be employed. When one or more screw-type expellers are used for the extrusion step, the frictional heating caused by the expeller screw is usually sufficient to raise the dough to the required temperature. Another successful and economical system employs a two-step heating process involving a preheating step accomplished by steam injection followed by frictional heating during the extrusion process itself. In the first step of the process, steam is injected into a dry dough or the flour itself to raise the temperature to about 160° to 220° F., and also to adjust the moisture content to the desired value within the preferred range of 15–45% moisture, forming a stiff dough. Because of the relatively low temperatures employed, little denaturation occurs during this initial heating step, provided the time of such heating remains below about four minutes.

In the second step of the two-step process, the stiff dough is conducted to a pressure chamber having one or more expeller screws located therein. Here the frictional forces of the screw against the dough are usually sufficient to further heat the dough to the extruding temperature of about 260° to about 380° F., within a time period of about 10 seconds to about one minute. In the event that the frictional energy of the expeller screw is insufficient to raise the temperature of the dough to the proper level within the desired time period, the frictional heating may be supplemented, for example, by a heating jacket external to the pressure chamber.

It is possible to further improve the process of the present invention by passing the dough through a high-speed mixer just before it enters the pressure chamber. Not only does this help insure homogeneity of the raw materials and the water as it is extruded, but it also provides a convenient point for the addition of flavoring and coloring materials prior to extrusion. The preferred extrusion temperature for the dough is about 295° to about 335° F., while the preferred heating time for the second step of the process is about 20 to about 40 seconds. Within the aforementioned preferred time and temperature ranges, excellent results are achieved in most cases.

After the dough has been heated for a sufficient time period, it is extruded through an orifice into an area of reduced pressure, preferably atmospheric pressure. However, the particular pressure is not critical, except that it must be below the vapor pressure of the water entrapped in the extruded product so that it will rapidly boil away or "flash off." The method of the present invention is usually carried out continuously, so that the time for which the dough is maintained at denaturation temperatures depends upon the speed of the extrusion, and such speeds should therefore be adjusted to maintain the denaturation times in the previously specified range. When a screw-type expeller is employed, the speed is easily varied by the simple adjustment of the rotation rate of the screw.

As the denatured dough emerges into the area of reduced pressure, the flashing off of the moisture causes the product to set in a form having an expanded, elongated cellular structure. The rapid evaporation of the water has the additional advantage that it carries away a portion of the volatile substances produced by the heating and extrusion process.

It is important that the orifice through which the denatured dough is extruded be of the proper design. There are two essential variables to be considered—the size of the orifice opening and the thickness of the orifice plate—as these two variables interact to maintain sufficient pressure within the vessel to prevent evaporation of the water in the dough. While there are no theoretical or critical limits on either of these variables, it is generally preferred to maintain the size of the opening within a diameter or cross sectional dimension of about ⅛ inch to about one inch, while the thickness of the orifice plate is maintained within the range of about ⅛ inch to about four inches. Because of the expansion of the product as the water flashes off at the orifice, the extruded product will have a diameter varying from about 2 to 4 times the diameter of the orifice. Generally speaking, the longer the dough is heated before expansion, the less expansion will result from the extrusion.

As the product is extruded into a continuous elongated shape, or into discrete particles of varying dimensions the combination of extrusion and the denaturation of the protein causes the formation of a product having an expanded, elongated cellular structure, and a fibrous protein orientation closely simulating lean meat. The extruded denatured dough is produced in either an elongated shape such as small diameter cylinders which may or may not be of uniform diameter along their length, or discrete particles of varying shapes and sizes. A strip, slice, rope strand or ribbon the dimension of which in at least one direction is at least about ⅛ of an inch will usually be produced. When the moisture content of a dough employing soybean flour is between about 30% and about 35%, the extruded product is torn into particles by the force of the escaping moisture. These particles are of varying sizes and shapes, but still possess a characteristic fibrous, elongated cellular structure. At lower moisture levels, where a continuous cylinder or bar is extruded, the product may be separated into segments of the desired length, for example, by cutting the bar into chunks simulating meat chunks. The product is dried to the desired moisture content, and subsequently may be colored, flavored, and hydrated to simulate meat. Alternatively, the flavoring and coloring agents may be added prior to the denaturation and extrusion of the dough.

The product of the present invention may be colored and flavored to simulate any of a large variety of lean meat types such as chicken, turkey, ground beef, beef chunks, beef stew, beef loaves, pork, pork sausage, meat emulsions, rabbit, duck, goose, pheasant, deer, elk, moose, pet foods, and the like. Because of its desirable texture and bland flavor, the product of the present invention is also very satisfactory as a meat extender. If it is desired to make such a use of the product, it is simply necessary to divide the extruded product into relatively small particles, which may be then incorporated into ground meat products.

Although the principle use of the protein products of the present invention is in the preparation of simulated meats, the products are also useful in many other applications. They may be employed, for example, in the preparation of bread and bakery items, flavored snacks, crunch coatings, breakfast foods and the like. When a brittle or crunchy product is desired, the expanded protein is used in its dehydrated form, while the texture of meat products is best simulated by a product hydrated with about 50 to 300% moisture. Such hydration is easily accomplished by soaking the expanded protein product in water.

The following examples are intended as illustrative, and are not to be interpreted as limiting the scope of the present invention other than as indicated in the appended claims.

EXAMPLE I

Undenatured, solvent-extracted, oil-free soy flour having 1.5% fat, and 8% moisture content was fed into a steam injection cylinder where it was injected with steam to raise the moisture content to 26% and the temperature to about 210° F. After remaining in the injection cylinder for 2 minutes, the stiff dough formed was then fed into a Wenger Model X-50BR Continuous Expansion Cooker, incorporating three expeller screws in series. The dough remained in the cooler for about 30 seconds, after which time the temperature had risen to 275° F. as a result of the frictional force of the screw against the dough. The dough was extruded through a ¼ -inch circular orifice, whereupon it immediately expanded to form a continuous bar of product. The bar of product was cut into segments by a variable speed cutting knife and dried to 8% moisture.

The continuous expansion cooker used and the method for obtaining the cooking and expansion are described in U.S. Pat. No. 3,117,006 issued Jan. 7, 1964 to Joseph Wenger. Other apparatus providing means for cooking, compressing and expansion may also be employed. Thus, means are provided for heating, admixing, moisturizing, compressing, product advancement and pressure release. The equipment also allows for various shapes and cross sectional configurations in the end product.

When the stiff dough is advanced through the continuous cooker, the transverse dimensions of the dough are reduced and the product is heated and compressed to an extent sufficient to raise the temperature thereof substantially. The pressure on the product is then reduced as it is extruding resulting in the expansion of the dough.

EXAMPLE II

Undenatured, solvent-extracted, oil-free soy flour having a fat content of 1% and a moisture content of 10% was fed into a steam injection chamber where the moisture content was raised to 32% and the temperature raised to about 210° F. After remaining in the injection chamber for 2.5 minutes, the dough was fed into a high-speed mixer to insure homogeneity, and subsequently into the same expansion cooker as employed in Example I. After remaining in the cooker for about 60 seconds, the temperature had risen to 325° F. as a result of the frictional forces involved. The dough was then extruded into the atmosphere through a 3/16-inch square orifice, whereupon it expanded forming an extruded product that was intermittently broken apart by the violent evaporation of moisture. The product was dried as in Example I.

EXAMPLE III

Undenatured, solvent-extracted, oil-free soy flour having a moisture content of 12% and a fat content of 1.1% was adjusted to pH 7.5 by the addition of aqueous sodium hydroxide, and the material was fed into a steam injection unit as in the previous examples where the moisture content was raised to 18% and the temperature raised to 180° F. After remaining in the injection chamber for 60 seconds, the dough was fed into the same expansion unit as employed in Example I, except that the unit was maintained at 310° F. by a steam jacket. After remaining in the cooker unit for a total of 20 seconds, the product was extruded through an orifice into a continuous bar. The temperature at the point of extrusion was 310° F. The product has a somewhat darker finish than was obtained with products extruded at the normal pH.

EXAMPLE IV

Undenatured, solvent-extracted soy flour having a fat content of 0.9% and a moisture content of 12% was acidified with sufficient aqueous phosphoric acid to adjust the pH to 6.0. The flour was then fed into a steam injection chamber as in the previous examples, wherein the moisture content was raised to 25% to form a dough, and the temperature was raised to 200° F. After 1.5 minutes in the chamber, the dough was fed into the same expansion cooker as employed in Example I. After remaining in the cooker for about 45 seconds, the temperature has risen to 28:0° F. as a result of the frictional forces of dough against the expeller screws. The dough was then extruded into the atmosphere through a ½-inch square orifice. The product was dried to 8% moisture and cut with a variable-speed cutter to produce cubic chunks of product. Because of the lower pH, the product had a ligher-than-normal color, and exhibited less expansion than products prepared at the normal pH.

EXAMPLE V

Undenatured, solvent-extracted soy flour having 1.3% fat was mixed with water containing a red-caramel coloring material to form a dough having a moisture content of about 22%. This dough was fed into a steam injection chamber as in the previous examples, where the moisture content was raised to about 26% after 2 minutes in the chamber. The dough was then fed into a high-speed mixer to insure homogeneity, and subsequently into the same expansion cooker as employed in Example I. After remaining in the cooker for about 40 seconds, the temperature had risen to about 325° F. as a result of the frictional forces produced. The dough was then extruded into the atmosphere where the bar formed was cut into segments by a variable-speed cutting knife and dried as in Example I. Because of the red-caramel coloring added to the dough prior to processing, the dough had a dark color closely resembling cooked meat.

EXAMPLE VI

Undenatured, solvent-extracted soy flour having a fat content of 1.4% was mixed with water to form a dough with about 25% moisture. The water in this instance contained a grayish-red color and a beef-extract flavor. The dough was then fed into a steam injection chamber where the moisture content was raised to 31% and the temperature raised to about 210° F. After remaining in the injection chamber for 3.5 minutes, the dough was fed into a high-speed mixer to insure homogeneity, and subsequently into the same expansion cooker as employed in Example I. After remaining in the cooker for about 20 seconds, the temperature had risen to 340° F. as a result of the frictional forces. The dough was then extruded into the atmosphere through a ⅜-inch circular orifice. Because of the relatively high moisture content, the product was broken into particles by the violence of the moisture evaporation upon extrusion. The product was dried to 7% moisture with forced air. After being rehydrated, the product had a color, flavor, and texture closely resembling ground cooked meat or beef chunks.

EXAMPLE VII

Undenatured, solvent-extracted soy flakes having a moisture content of 5% and a fat content of 1% were fed into a steam injection chamber where the moisture content was raised to 22% and the temperature raised to about 210° F. after 30 seconds in the chamber. Subsequently, the dough was fed into the same expansion cooker as employed in Example I. After remaining in the cooker for 25 seconds, the temperature had risen to 260° F., whereupon the product was extruded through a ¼-inch circular orifice into the atmosphere. The product was cut into segments and dried to 8% moisture. The product was sprayed with an oil suspension of a yellow color and a cheddar cheese flavoring agent. The resulting product formed a crunchy cheese snack having a very desriable flavor and texture.

EXAMPLE VIII

Undenatured, solvent-extracted soybean flour having 1.4% fat was mixed with water to form a stiff dough of 24% moisture. The dough was fed into the Wenger Continuous Expansion Cooker employed in Example I, which was maintained at 200° F. by heat supplied from an external steam jacket. After remaining in the cooker for 45 seconds, the dough had reached a temperature of 315° F., whereupon it was extruded into the atmosphere through a ¼-inch round (shape) orifice. The expanded product was cut into segments and dried to 8% moisture.

EXAMPLE IX

Vapor desolventized, solvent-extracted, glanded cottonseed flour having a fat content of 0.15%, a moisture content of 5.3%, a protein solubility of 78%, and a gossypol content of 1.5% was injected with steam and water to form a dough of 45% moisture, based on the weight of the dough. The steam injection also raised the temperature to 180° F. The dough was fed into the Wenger Continuous Expansion Cooker employed in Example I. After remaining in the cooker for approximately 30 seconds the dough had reached a temperature of 350° F., whereupon it was extruded into the atmosphere through a ½-inch orifice. The product emerged as a continuous bar of about 1.25 inch diameter, and had a greenishbrown color. The product was cut into segments as it emerged, and was dried. The product had a bland flavor, and, when moistened, a chewy texture.

EXAMPLE X

Vapor desolventized, solvent-extracted, glanded cottonseed flour having the same composition as in Example IX was mixed with water to form a dough having a moisture content of 25%, based on the total weight of the dough. Steam was introduced for approximately two minutes to raise the moisture content to 29% and the temperature to 200° F. This relatively dry dough was fed into the Wenger Cooker employed in Example I, where it was frictionally heated to 300° F. over a time period of about 40 seconds. The product was extruded through a ½-inch orifice. The product exhibited much less expansion than in the previous example, and was not as attractive in appearance. The extruded product was cut into sections and dried. When remoistened, the product had a chewy texture.

EXAMPLE XI

A vapor desolventized, solvent-extracted, glandless cottonseed flour having a fat content of 0.6%, moisture content of 5.4%, protein solubility of 94%, and a total gossypol content of 0.01%, was injected with the steam and water to form a dough of 40% moisture. The steam raised the temperature to 180° F. The dough was fed into a Wenger Cooker as in the previous examples. After remaining in the cooker for about 25 seconds, the dough had been frictionally heated to 275° F. The product was then extruded through a ⅜-inch diameter orifice into the atmosphere. The extruded product had a diameter of about 1½ to 2 inches, and was quite porous. After drying, the product was light tan in color.

EXAMPLE XII

Vapor desolventized, solvent-extracted, glandless cottonseed flour having a fat content of 0.65%, a moisture content of 5.9% and a protein solubility of 94% (based on the total protein), and a total gossypol content of 0.01%, was injected with steam and water for a period of two minutes, raising the moisture content to 30% and the temperature to 180° F. The dough was then fed into the Wenger Cooker employed in the previous examples. After remaining in the cooker for approximately 30 seconds, the dough had been frictionally heated to a temperature of 300° F., whereupon it was extruded into the atmosphere through a ½-inch diameter orifice. The product did not exhibit as much expansion as those prepared from higher moisture doughs, but was still expanded and had an attractive appearance.

Obviously many modifications and variations of the invention as hereinbefore set forth may be made without departing from the spirit and scope thereof, and, therefore, only such limitations should be imposed as are indicated in the appended claims.

I claim:

1. A method for preparing an improved protein food product comprising: forming a dough containing from about 15% to about 45% by weight, of water and defatted, undenatured, solvent-extracted oil seed protein material; heating said dough for a period of time less than about five minutes under pressure to a temperature of about 260° F. to about 380° F., sufficient to rapidly denature the protein of said dough, said dough having sufficient plasticity to be extruded in a self-binding form; and extruding said heated dough into an area of reduced pressure under conditions causing the dough to expand by the flashing of moisture therefrom, and causing sufficient denaturation to occur prior to said heated dough reaching said area so as to cause the product to retain an elongated cellular structure created by said flashing of moisture upon reaching said area.

2. The method of claim 1 wherein said protein contains less than 3% fat, and wherein at least 50% of the total protein is present in the water-soluble state.

3. The method of claim 1 wherein said protein is cottonseed protein.

4. The method of claim 1 wherein said protein is soybean protein and wherein said dough contains from about 15% to about 35% water, based on the total weight of the dough.

5. The method of claim 4 further including the step of incorporating coloring and flavoring agents into said dough.

6. The method of claim 4 wherein said dough is heated for less than about 5 minutes to a maximum temperature of about 295° F. to about 335° F.

7. The method of claim 6 wherein the extruded product is subsequently dried.

8. The method of claim 1 further including the steps of preheating said protein for less than about 4 minutes to a maximum temperature below about 220° F. and adjusting the moisture content of said dough to about 15% to 45% water, based on the weight of said dough; and wherein said dough is further heated under pressure for less than about 1 minute to a maximum temperature of about 260° F. to about 380° F.

9. The method of claim 8 wherein said protein is soybean flour and the moisture content of said dough is adjusted to about 15% to 35% water, based on the total weight of said dough.

10. The method of claim 8 wherein said protein is soybean flakes and the moisture content of said dough is adjusted to about 15% to 35% water, based on the total weight of said dough.

11. The method of claim 8 wherein said protein is cottonseed flour.

12. The method of claim 8, further including the step of adding coloring and flavoring materials to said dough.

13. The method of claim 1 wherein said dough is substantially free of farinaceous materials.

14. The method of claim 1 wherein said dough is substantially free of ionic salts.

15. The method of claim 1 wherein said dough is maintained in the range of pH 5.5 to 7.5 prior to denaturation.

16. The method of claim 1 wherein said dough is subjected to the frictional forces of an expeller screw.

* * * * *